Dec. 23, 1952   R. CHAMBONNEAU   2,622,711
SEMIAUTOMATIC SPEED CHANGING DEVICE
Filed May 9, 1950   5 Sheets-Sheet 1
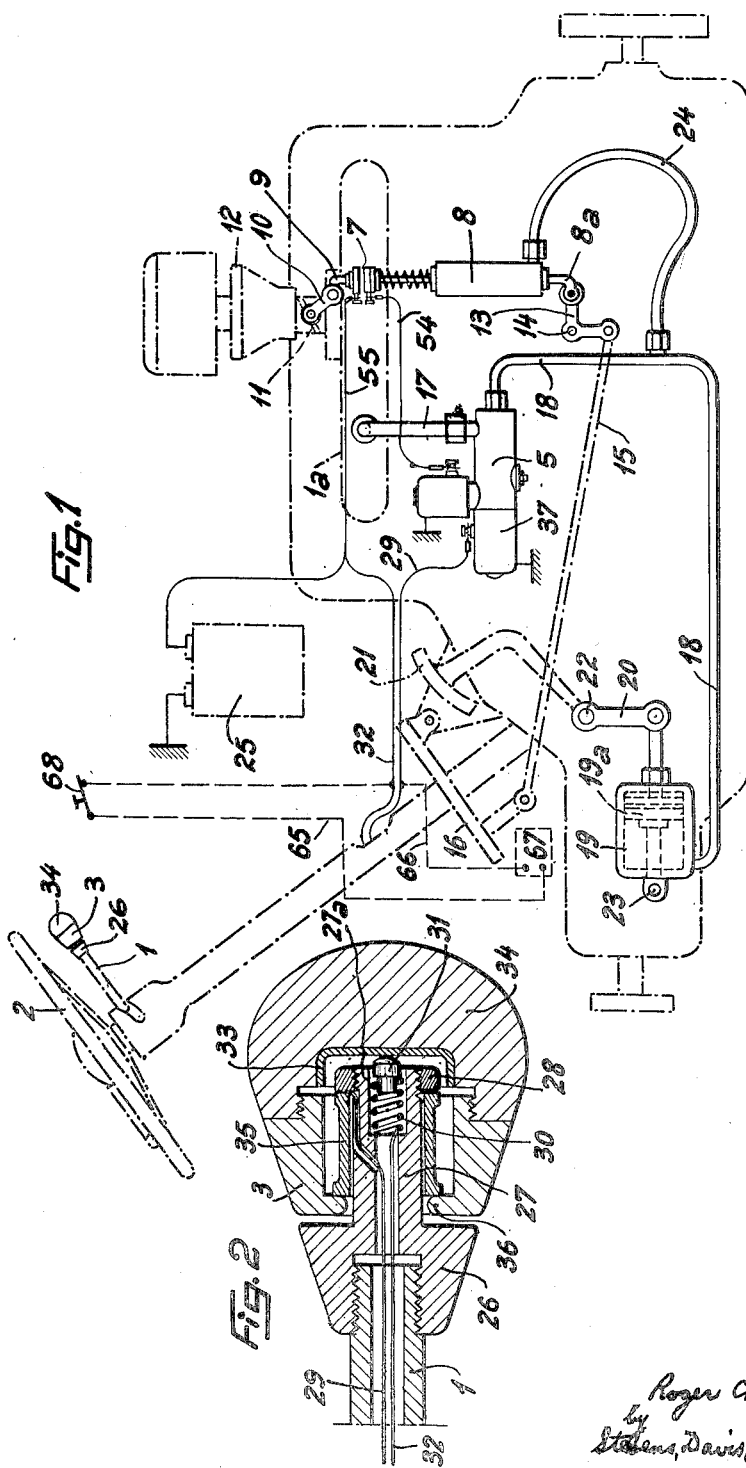

Dec. 23, 1952 — R. CHAMBONNEAU — 2,622,711
SEMIAUTOMATIC SPEED CHANGING DEVICE
Filed May 9, 1950 — 5 Sheets-Sheet 2
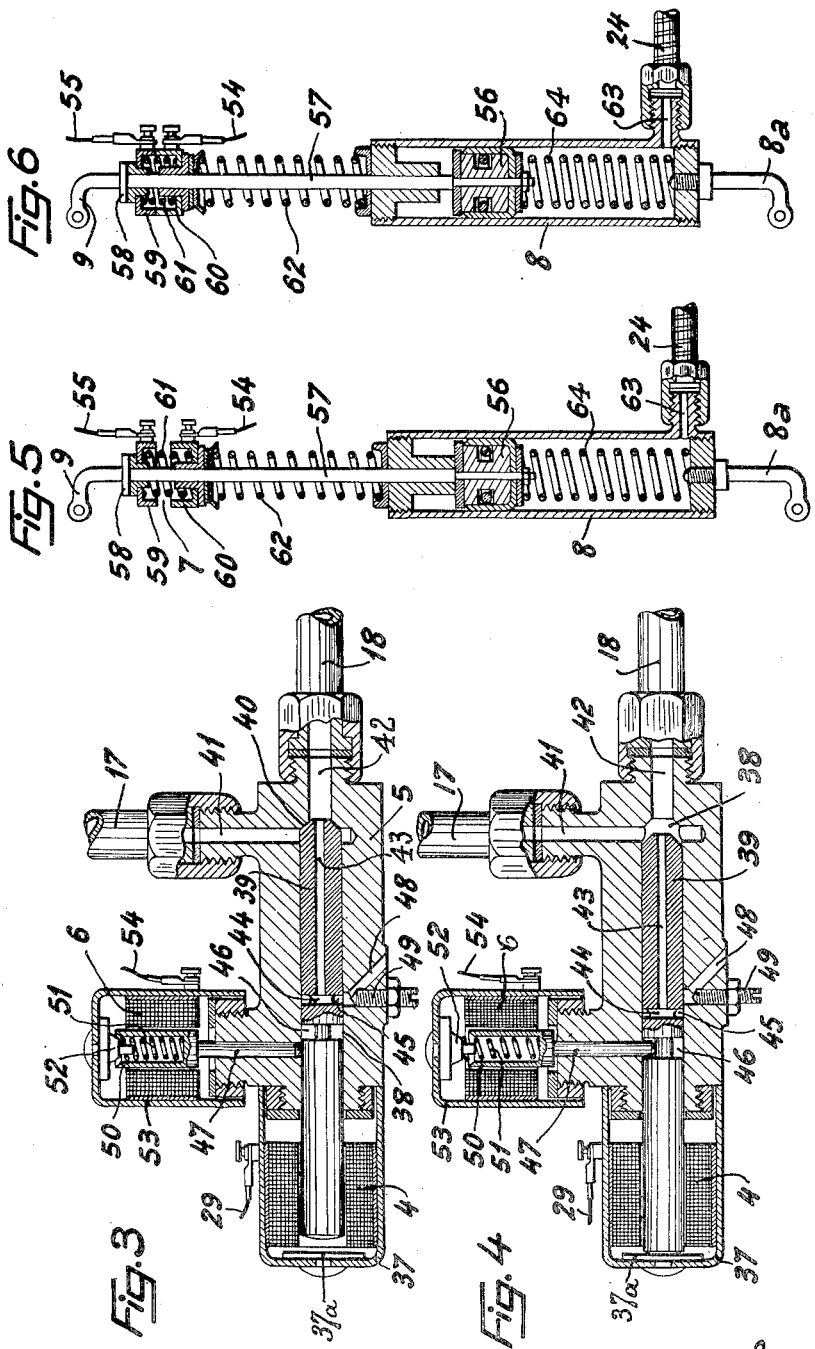
Inventor
Roger Chambonneau
by Stevens, Davis, Miller & Mosher
his attorneys

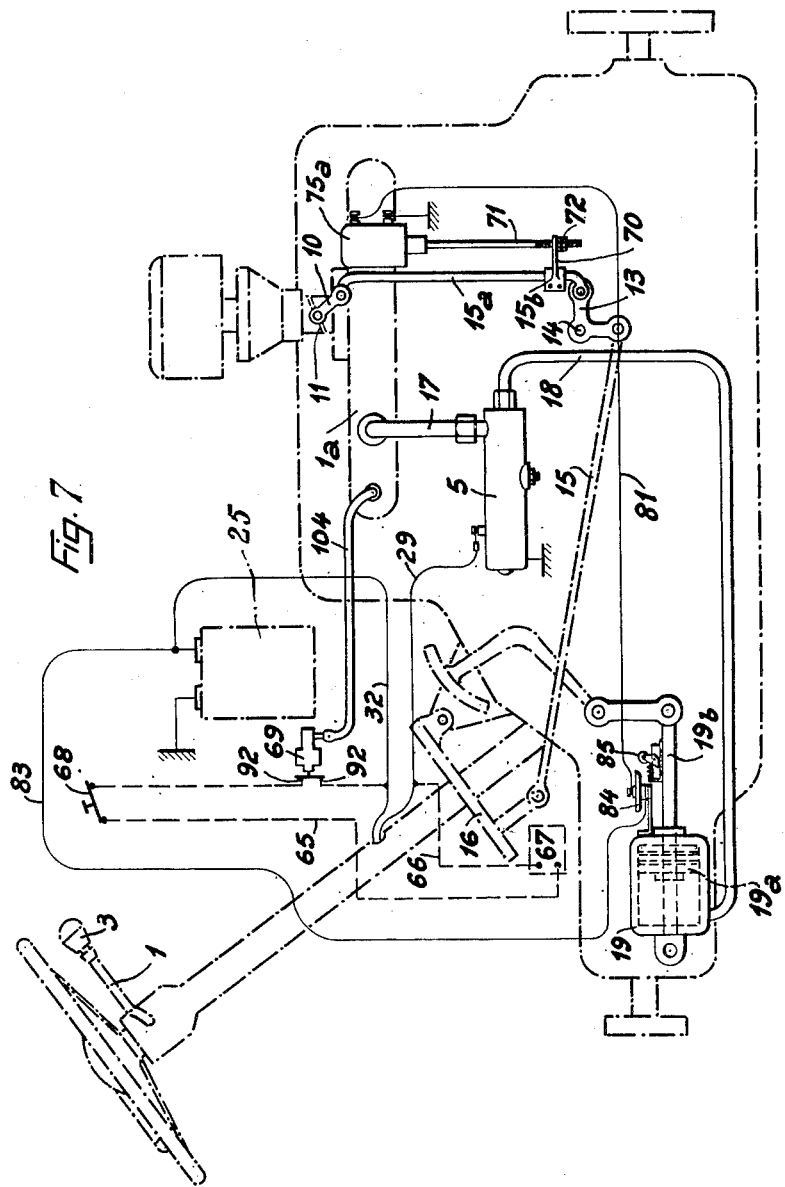

Dec. 23, 1952 R. CHAMBONNEAU 2,622,711
SEMIAUTOMATIC SPEED CHANGING DEVICE
Filed May 9, 1950 5 Sheets-Sheet 4
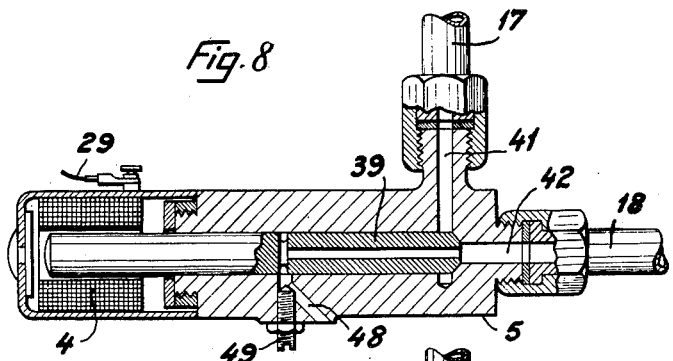
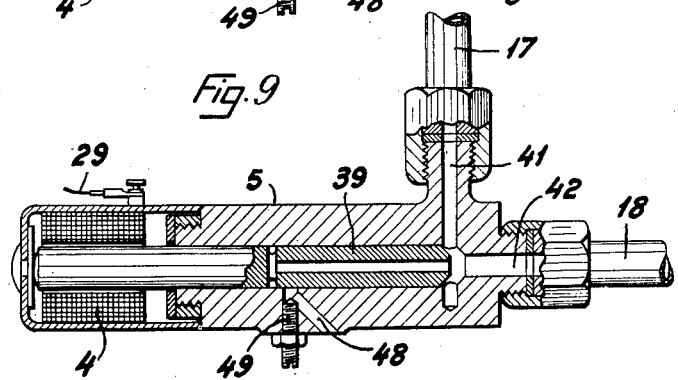
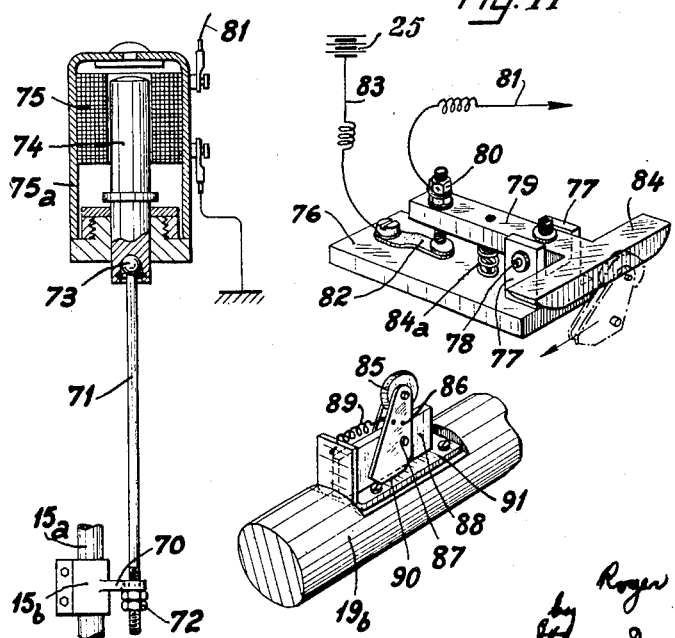
Inventor
Roger Chambonneau
by Stevens, Davis, Miller & Mosher
his attorneys

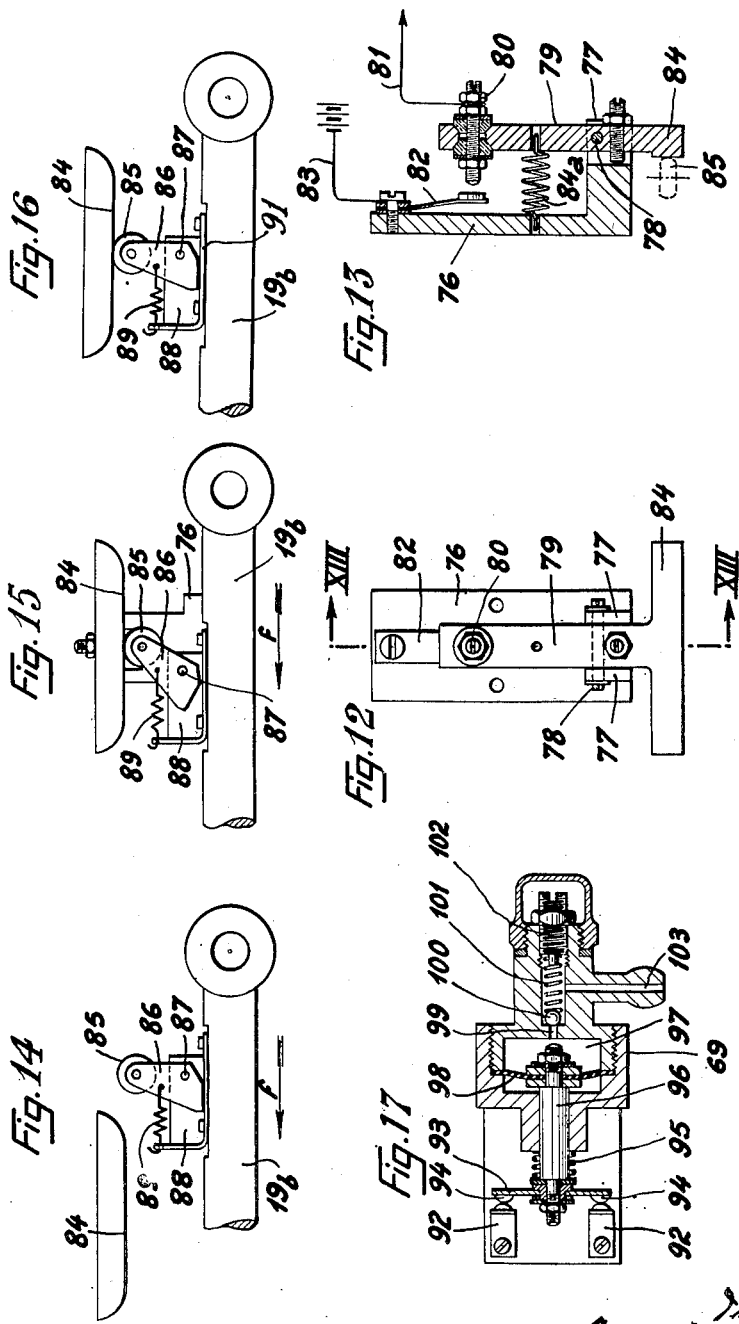

Patented Dec. 23, 1952

2,622,711

UNITED STATES PATENT OFFICE 2,622,711

SEMIAUTOMATIC SPEED CHANGING DEVICE

Roger Chambonneau, Caracas, Venezuela

Application May 9, 1950, Serial No. 160,920
In France October 28, 1949

13 Claims. (Cl. 192—.08)

When changing speed in a motor vehicle, it is necessary, as known, to perform a plurality of combined operations, viz. to lower the clutch pedal after releasing the accelerator, to actuate the gear shift lever in order to bring it to the position corresponding to the desired velocity, to release the clutch pedal while stepping on the accelerator.

In motor vehicles provided with an automatic speed changing device, these combined operations are reduced to a mere actuation of a lever or a pedal; however, automatic speed changing devices are very costly, often delicate, and further hinder somewhat the freedom of the driver in controlling the engine.

The present invention has for its object a semi-automatic speed changing device designed so that the actuation of the gear shift lever automatically causes declutching of the engine, coupling and opening of the butterfly throttle taking place simultaneously and progressively, after said lever has been brought to the desired position and released, either automatically or by actuating the accelerator pedal. Both operations, i. e. coupling and acceleration, being synchronized, a perfect pick up of the engine for the new selected velocity, is ensured.

According to a form of the present invention, the control of the clutch mechanism and of the butterfly throttle are ensured by vacuum-operated members; for this purpose, these members are connected to the suction manifold of the engine through a slide-valve whose opening and whose locking in that position, are controlled by an electric circuit which is automatically closed at each actuation of the gear shift lever, the unlocking of the slide-valve taking place after closing a second circuit by means of a switch controlled by the accelerator pedal.

The invention also concerns the various members enabling to ensure the above operations, viz. the slide-valve, the switch controlled by the gear shift lever and the switch controlled by the accelerator pedal.

In a further embodiment of the invention, the locking of the slide-valve being done without, coupling and opening of the butterfly throttle automatically and progressively take place as soon as the driver releases the gear shift lever after having brought it to the position corresponding to the new desired speed.

According to another form of the invention, the closing of the slide-valve control electric circuit is effected by a switch actuated by the brake-pedal, a second switch being provided for breaking at will the circuit, thus rendering it independent from the action of the brake-pedal. Moreover, the invention includes a modification to this control device through the brake-pedal so as to allow on the one hand braking at high speeds without affecting the clutch and to ensure on the other hand automatic declutching of the engine at low speeds by stepping on the brake-pedal.

Other objects and advantages of the invention will be apparent during the course of the following description.

In the accompanying drawing forming a part of this application and in which like numerals are employed to designate like parts throughout the same, Fig. 1 is a general view of the device fitted up on a motor vehicle engine, Fig. 2 is a section of the gear shift lever knob showing the control switch, Figs. 3 and 4 show, in two different positions, the clutch control member, Figs. 5 and 6 show, in two different positions, the differential relay device controlling the carburetor, Fig. 7 is a general view of a further form of the present invention, Figs. 8 to 17 are detail views of Fig. 7, Figs. 8 and 9 are longitudinal sections of the clutch control member, in two different positions, Fig 10 is a vertical section of the throttle control device, Fig. 11 is a perspective view of a switch actuated by the piston of the clutch control cylinder, Fig. 12 is a plan-view of this switch, Fig. 13 is a section taken along line XIII—XIII of Fig. 12, Figs. 14, 15 and 16 are diagrams illustrating the operation of the switch shown in Figs. 11 to 13, and Fig. 17 is a longitudinal section of a vacuum-operated switch.

The device of the invention is fitted up on a motor vehicle as shown in the drawing.

The gear shift lever 1 (Fig. 1) arranged as shown under the steering wheel 2, is completed by a pear-shaped knob 3 which constitutes as described hereafter, a switch for controlling the feed-circuit of a coil 4 (see also Fig. 3) belonging to an electromagnetic valve 5 which includes a second coil 6 whose feed-circuit is controlled by a switch 7 operated by a relay 8. The latter is hinged, on the one hand through an upper extension 9, on the lever 10 of the butterfly throttle 11 of a conventional carburetor 12, and on the other hand through a lower extension 8a, on a bent lever 13 pivoting about 14 and connected further, through an appropriate linkage 15, to the accelerator pedal 16.

The electromagnetic valve 5 is connected, through a pipe 17, to the suction manifold 1a of the engine; it is further connected, through a pipe 18, to a cylinder 19 containing a piston 19a. This piston 19a is connected on the one hand, through a linkage 20, to the clutch pedal 21 pivoting about 22, and on the other hand, through a joint 23, to the moving part of a conventional clutch (not shown on the figure).

A flexible pipe 24 connects pipe 18 to a differential relay 8. The conventional battery 25 feeds the control circuits of coils 4 and 6 of the electromagnetic valve.

Referring to Fig. 2, the control switch of coil 4 is constituted by a particular arrangement of the end portion of the gear shift lever 1 which ends as usual in a pear-shaped knob facilitating handling by the driver.

According to the invention this end portion is essentially composed of two parts 3 and 26 made of insulating material, part 26 being fast with lever 1, for instance by screwing it thereon. This part 26 extends through a cylindrical portion 27 at the extremity of which a metal ring 28 connected to a conductor 29 leading to coil 4 (see also Fig. 1), is secured. This cylindrical portion 27 has a boring 27a inside which a spring 30 is located. The latter is fast with a small plug 31 electrically connected (through spring 30) to conductor 32 leading to the battery 25.

The plug 31 urged by spring 30, is permanently applied on a cup-shaped contact member 33 embedded in a head 34 screwed on the part 3 which, owing to this fact, tends to move away from the fixed part 26, a spacer-sleeve 35 inserted between the edge 36 of the knob 3—34 and the ring 28, limits the displacement of this knob.

The feed-circuit of coil 4 is closed, i. e. conductors 29 and 32 are connected, merely by pushing the moving knob 3—34 so that, by compressing spring 30, the bottom of the cup-shaped member 33 comes into contact with the ring 28. In order not to be restricted, for closing the circuit to exerting a push in a direction parallel to the axis of lever 1, the moving knob is fitted up with sufficient clearance on the cylindrical portion 27 so as to allow pushing obliquely this knob 3—34, thus causing the rim of the cup-shaped member 33 to come into contact with ring 28.

Under these circumstances, every time the driver actuates lever 1 by handling it through its knob, he will automatically close the feed-circuit of coil 4, this circuit being automatically broken as soon as he releases lever 1.

The electromagnetic valve 5 (Figs. 3 and 4) is constituted by a main body-portion at one end of which a casing 37 is fitted up; this casing contains coil 4 which is therefore arranged coaxially with respect to the body-portion of the valve. The latter comprises an axial boring 38 inside which a slide-valve 39 can move. In the position shown in Fig. 3 (which is the position at rest), slide-valve 39 is applied at one end on a seat 40 at the extremity of boring 38, thus cutting off pipe 17 connected through a duct 41 to boring 38, from pipe 18 connected to said boring 38 through a duct 42.

Slide-valve 39 is pierced along its axis with a duct 43 opening up in a diametral duct 44 both ends of which are connected through an annular groove 45. In the vicinity of groove 45, the slide-valve comprises a circular slot 46 into which the tip of a plunger 47 can penetrate; this plunger is controlled by the coil 6 as described hereafter.

The body-portion of the valve comprises a duct 48 which connects boring 38 to the atmosphere. A valve-screw 49 enables to adjust the passage cross-section of duct 48.

The plunger 47 comprises a portion 50 of sufficiently large diameter for fitting up therein a compression spring 51 inserted between the bottom of the box 50 and a mild iron member 52 carried by a casing 53 secured to the body-portion of the valve and enclosing the coil 6.

Coil 6 is connected through a conductor 54 (see Fig. 1) to one of the terminals of a switch 7 of a differential relay 8, the other terminal of this switch being connected through a conductor 55 to the battery 25.

The relay 8 is constituted by a cylinder containing a piston 56 (Figs 5 and 6) whose rod 57 is provided with a thrust bearing 58 supporting a small cup-shaped member 59. A further cup-shaped member 60 can slide along rod 57 and is urged away from member 59 by a spring 61 applying said member 60 on the tip of a spring 62 supported on the cylinder of the relay.

The cup-shaped members 59 and 60 are connected to conductors 55 and 54 respectively and they form the two contacts of the above-mentioned switch 7.

The rod 57 extends beyond the thrust bearing 58 and is linked through its tip 9 to the throttle lever 10.

Towards its lower end, the cylinder of the relay comprises a duct 63 connected to the flexible pipe 24. A spring 64 urges piston 56 away from this end.

The above-described device operates as follows:

When the driver wants to change gear, he grips the knob 3—34 for the purpose of actuating lever 1. By doing this, he exerts automatically a push on this knob and hence closes the feed-circuit of coil 4, through conductors 32 and 29.

This coil when energized causes the slide-valve 39 to move from the position shown in Fig. 3 to that shown in Fig. 4. In its motion of translation, rod 39 abuts onto a mild iron platelet 37a secured to the casing 37, and it opens ducts 41 and 42 which are hence connected together through boring 38.

Slide-valve 39 is held in its new position (Fig. 4) even when the driver has released the gear shift lever owing to the engagement of the tip of plunger 47 urged by spring 51 into the circular groove 46.

The underpressure prevailing in the suction manifold 1a (Fig. 1) of the engine, is transmitted through pipe 18 to cylinder 19; piston 19a therefore moves towards the left. This translation motion conveyed to the moving member of the friction clutch, automatically causes declutching of the driving wheels.

At the same time, the underpressure prevailing in pipes 18 and 24 is conveyed to piston 56 (Figs. 5 and 6); piston 56 is urged by this underpressure towards the bottom of the cylinder, i. e. the relay tends to contact; but owing to the effort conveyed by spring 64 to cylinder 8 and to linkage 15, the accelerate pedal 16 moves upwards. The butterfly throttle 11 being in the closing position, it remains tightly held in that position and prevents further displacement of piston 56.

The throttle 11 will remain closed until the driver, by exerting sufficient pressure on pedal 16, will have brought about a certain displacement thereof; this motion conveyed through linkage 15—13 to cylinder 8, displaces upwards the latter against the action of spring 64. Because of this relative displacement of the cylinder and of the piston, spring 62 is compressed and its action becomes prevailing over that of spring 61 which gets sufficiently compressed for allowing contact between the cup-shaped members 59 and 60 (Fig. 6). This contact causes the switching on of coil 6 (through conductors 54 and 55, Fig. 1). This coil being energized, it attracts plunger 47 forming its armature; the latter moves then from the position shown in Fig. 4 to that shown in Fig. 3.

Slide-valve 39 being no longer locked by plunger 47 nor urged by coil 4 which is de-energized, returns (owing to the underpressure prevailing in pipes 17, 18 and in boring 38) to the position shown in Fig. 3 and hence connects pipe 18 to the atmosphere through duct 48 while obturating duct 41. The rise in pressure up to atmospheric pressure lasts a time determined by the position of the screw 49.

Piston 19a being no longer subjected to suction, returns to its position of rest, owing to the action of the clutch-spring; the clutch is therefore urged back to its operative position for which the wheels are driven by the engine.

At the same time, the cylinder 8 of the differential relay is connected to the atmosphere. The piston 56 being no longer subjected to suction moves upwards owing to the action of spring 64. This translation motion of the piston and of its rod causes first the lever 10 to move angularly so as to open the throttle 11 of the carburetor, and then—when the stroke of the piston will have been sufficient for the tension of spring 62 to become less than that of spring 61—the cup-shaped members 59 and 60 to move apart and hence to switch off coil 6, plunger 47 remaining however in its position of rest shown in Fig. 3, owing to the displacement of slide-valve 39 towards the right.

It is hence clear that as soon as the driver actuates the gear shift lever, he automatically causes the declutching of the driving wheels and the closing of the butterfly throttle; this declutching and this closing of the butterfly throttle take place until the driver, by stepping on the accelerator, actuates an unlocking device arranged in such a way that, after a certain time which may be adjusted (by the screw 49 controlling the passage cross-section of the atmosphere duct 48), coupling be automatically reestablished while the progressive opening of the butterfly throttle takes place.

According to another form of the invention (Figs. 7, 8 and 9), the locking device of the slide-valve 39 is done without, so that, as soon as the feed-circuit of coil 4 is broken, the slide-valve 39 which lies in the position shown in Fig. 9, returns, owing to the underpressure prevailing in ducts 41, 42, to the position shown in Fig. 8 whereby duct 41 is obturated, while duct 42 and hence pipe 18 are connected to the atmosphere through the adjustable port 48.

Under these conditions, it is clear that, on the one hand, the actuation of lever 1 in order to bring it to the position corresponding to the new selected velocity, automatically causes cylinder 19 to be connected to the suction manifold 1a of the engine, thus bringing about the displacement of piston 19a and hence declutching the engine, and that, on the other hand, the release of lever 1 in its new position automatically cuts off cylinder 19 from the suction manifold 1a, cylinder 19 being further connected to the atmosphere, whereby after a certain time adjusted by obturating more or less duct 48 by means of screw 49, the piston is brought back to its original position for which the engine is coupled.

This arrangement avoids having to step on the accelerator in order to unlock slide-valve 39 as described above.

In order to ensure a proper pick up of the engine, it is necessary, when coupling, to open progressively the butterfly throttle, both when the vehicle is at rest and the driver goes through first gear, and when the vehicle is running and the driver gears up, for in the latter case, when actuating lever 1, the driver releases, from habit, the accelerator.

According to the present embodiment of the invention, the control linkage of throttle 11 which comprises as usual a lever 10, a rod 15a, a bent lever 13 and a spindle 15 linked to the pedal 16, is completed by a small flange 70 (Figs. 7 and 10) secured to rod 15a, for instance, by means of a sleeve 15b.

The flange 70 is pierced with a hole through which a rod 71 can freely slide; this rod 71 is threaded at its lower part and provided with a nut and a check-nut as shown in 72, this nut constituting a stop adjustable along rod 71 for abutting against flange 70.

At its top, rod 71 ends in a spherical cap 73 engaged in a corresponding socket provided at the foot of an armature 74 urged by a coil 75 located inside a casing 75a secured to the engine.

When the feed-circuit of coil 75 is closed, the armature 74 is attracted and, through rod 71, it drags upwards the rod 15a, thus causing the butterfly throttle 11 to open.

The flange 70 is only dragged along by rod 71 when the latter moves upwards so that it is possible to actuate the butterfly throttle 11 in the usual way, by means of pedal 16.

The feed-circuit of coil 75 is controlled by a switch which only closes the circuit when piston 19a moves back to its position of rest for which the engine is coupled, whereas in its leftward stroke which brings about declutching, the piston does not act on said switch.

Owing to this fact, during progressive coupling of the engine, the butterfly throttle 11 is also progressively opened.

Referring to Figs. 11 to 16, the switch controlling the circuit of coil 75 is seen to comprise a fixed support secured for instance to cylinder 19 (Fig. 7); on this support is fitted an insulating platelet 76 having two small flanges 77 supporting a small axle 78 about which a T-shaped member can pivot; the branch 79 of this member comprises a stud 80 connected to a wire 81 leading to coil 75 (Figs. 7 and 11). This stud 80 is arranged opposite a strip 82 with which it comes into contact when the branch 79 is angularly displaced about its axle 78. This strip 82 is connected to a conductor 83 leading to the battery 25. A spring 84a inserted between the branch 79 and the platelet 76 normally holds branch 79 in the position for which there is no contact between the stud 80 and the strip 82.

The branch 79 is completed by a branch 84 which constitutes a kind of cam along which a roller 85 can roll; the latter is carried by a lever 86 pivotally mounted at 87 on a support 88 secured to the spindle 19b of the clutch control piston.

A spring 89 urges lever 86 in the vertical position shown in Figs. 11, 14 and 16; this position is determined by the abutment of the lower rim 90 of lever 86 on the baseplate 91 of the support 88. Lever 86 can therefore only pivot about axle 87 in opposition to the action of spring 89.

Referring to Figs. 7 and 14, it is noted that when piston 19a is in the position of rest (engine coupled), lever 86 lies at the right of cam 84.

When, owing to suction, piston 19a moves towards the left in cylinder 19 (for declutching the engine), the roller 85 driven in the direction of arrow f will meet the cam 84 and the lever 86 will pivot in opposition to the action of spring 89, so as to come in the position shown in Fig. 15; cam 84 held in place by the action of spring 84a will remain in its original position for which stud 80 is at a distance from strip 82; consequently, the feed-circuit 83—81 of coil 75 will remain open and hence, rod 15a not being driven, the butterfly throttle will be held closed owing to the action of its return spring.

On the contrary, when piston 19a returns to its position of rest, the roller 85 (which, during the stroke of piston 19a bringing about declutching, has moved beyond cam 84, as shown in Fig. 11) moves in the direction opposite to that of arrow f and will meet cam 24, but lever 86 which rests on the base-plate 91, is held in the vertical position (Fig. 16). Hence, cam 84 is raised in opposition to the action of spring 84a, and the stud 80 comes into contact with the strip 82, thus closing the feed-circuit 83—81 of coil 75 and causing the throttle 11 to open.

According to another form of the invention, the switching on of coil 4 may be effected by lowering the brake-pedal. It is enough for this purpose to connect conductors 29 and 32 through conductors 65 and 66 (shown in dotted lines in Figs. 1 and 7), to a switch 67 controlled by the said brake-pedal; this switch 67 may merely be the braking signal switch. In other words, the former switch located in the knob of the gear shift lever is short-circuited when this switch 67 is closed.

Under these conditions every time the driver steps on the brake-pedal, coil 4 is energized, switch 67 playing the part formerly played by switch 28—33. A further switch 68 located for instance on the instrument panel, enables to put in circuit, at will, this device whose use is particularly convenient for town traffic, for it is necessary to stop and start alternately and often.

In the embodiment of Fig. 7, a device is provided for enabling the driver to put on the brakes at high and medium speeds without thereby acting on the clutch.

For this purpose, the energizing circuit of coil 4 comprises, besides switches 67 and 68, a switch 69 shown in Fig. 17 and arranged so as to allow switching on coil 4 when the engine runs slowly and, on the contrary, to prevent switching on when the engine runs at a high rate and the driver puts on the brakes.

Switch 69 which is connected to the feed-circuit of coil 4 through studs 92 comprises a plate 93 provided with two studs 94 which are normally held in contact with the studs 92 owing to the action of a spring 95 inserted around a rod 96 carrying the plate 93. This rod 96 leads to a cavity 97 and is secured to a diaphragm 98 constituting a partition dividing cavity 97.

This cavity 97 is connected to a duct 99 which is normally obturated by a ball or valve 100 urged by a spring 101 whose tension can be adjusted by means of a screw 102.

The spring 101 is located in an enclosure connected through a duct 103 and a pipe 104, to the suction manifold 1a of the engine (Fig. 7).

The spring 101 is given such a tension that its action on ball 100 be prevailing over that produced by suction exerted on said ball, when the engine runs slowly, so that, under these conditions, ball 100 remains applied on its seat and obturates duct 99; but as soon as suction reaches a predetermined value (which is related to the rate of the engine after the driver has released the accelerator in order to step on the brake-pedal), its action becomes prevailing over that of spring 101 and the ball 100 is driven away from its seat, thus opening duct 99. The diaphragm 98 is then subjected to suction and is deflected, thus dragging, in opposition to the action of spring 95, the rod 96 and the plate 93. The studs 94 are moved away from the studs 92 and coil 4 cannot be switched on by switch 67 when the brake-pedal is lowered.

Hence, when the vehicle is at rest and the engine is slow running or when the vehicle is moving at a low velocity, the driver by stepping on the brake-pedal, actuates switch 67 thus switching on coil 4 (obviously the hand switch 68 on the instrument panel, is supposed to be closed); coil 4 being energized, it causes, as described above, declutching. By releasing the brake-pedal, the driver automatically causes switch 67 to open thus switching off coil 4.

On the other hand, when the vehicle runs at a relatively high velocity, the action of the driver on the brake-pedal (the butterfly throttle being then closed), has no effect on the clutch owing to the fact that suction keeps plate 93 away from the studs 92.

If the driver keeps stepping on the brake-pedal, he will automatically cause declutching when the vehicle having sufficiently slowed down, it will no longer drive the engine, thus reducing suction to a value which is insufficient for balancing the action of spring 101.

It is to be understood that the form of the invention herewith shown and described is to be taken as a preferred example of the same and that various changes in the shape, size and arrangement of parts may be resorted to without departing from the spirit of the invention or the scope of the subjoined claims. In particular, the suction control members instead of being directly connected to the suction manifold of the engine, may obviously be connected to an auxiliary tank fed by the engine or, in the case of engines of low cylinder-capacity, to a pump driven by the engine.

What I claim is:

1. A semi-automatic speed changing device for a vehicle provided with wheels connected to an engine through a clutch and a gear-box controlled by a gear shift lever, said engine being fed through a carburetor provided with a butterfly throttle connected through a linkage to an accelerator pedal, said device comprising pressure-operated means for actuating said clutch; piping means between said pressure-operated means and a source of pressure adapted to feed the same; electromagnetic valve means for controlling said piping means; a source of electric current adapted to energize said valve means and connected thereto through an electric circuit; in said circuit a switch adapted to be operated while the gear shift lever is actuated and to be returned to its initial position when said gear shift lever is released; electromagnetically operated means for progressively opening said butterfly throttle; a source of electric current adapted to energize said electromagnetically operated means and connected thereto through electric conductors; a switch in at least one of said conductors; and means for momentarily actuating said latter switch when said pressure-operated means bring about coupling of said clutch, whereby said electromagnetically operated means momentarily cause said butterfly throttle to open.

2. A speed changing device according to claim 1 wherein the electromagnetically operated means comprise a rod; connecting means between said rod and said linkage for displacing the latter in the opening direction of said butterfly throttle; and a coil adapted to control said rod.

3. A speed changing device according to claim 1 wherein the pressure-operated means is a vacuum-operated cylinder containing a piston linked to the clutch and adapted to bring about declutching when subjected to suction; and wherein the means for momentarily actuating the latter switch comprises a pivoting arm carried by a rod integral with said piston; means for preventing said arm from pivoting beyond a predetermined position; a return spring adapted to urge said arm in said position; a cam arranged on the path of the tip of said arm, so that said arm comes into contact with and moves past said cam when said piston effects a complete stroke; a pivoting lever integral with said cam; a return spring adapted to act on said lever for urging said cam towards said arm, the relative tensions of said return spring being such that, and said position being predetermined so that, when the piston is actuated for declutching the engine, said arm is caused to pivot after coming into contact with said cam, whereas when the piston moves for coupling the engine, said arm remains in the predetermined position thus causing said lever to pivot during contact between said arm and said cam.

4. A semi-automatic speed changing device for a vehicle provided with wheels connected to an engine through a clutch and a gear-box controlled by a gear shift lever, said engine being fed through a carburetor provided with a butterfly throttle connected through a linkage to an accelerator pedal, said device comprising pressure-operated means for actuating said clutch and pressure-operated means for actuating said butterfly throttle; piping means between said pressure-operated means and a source of pressure adapted to feed the same; electromagnetic valve means for controlling said piping means; electromagnetic locking means associated with said valve means; a source of electric current adapted to energize said electromagnetic means through respective energizing circuits; in the energizing circuit of said valve means, a switch adapted to be operated while the gear shift lever is actuated and to be returned to its initial position when said gear shift lever is released; and in the energizing circuit of said locking means, a switch adapted to be operated when the accelerator pedal is lowered.

5. A speed changing device according to claim 4 wherein the electromagnetic valve means comprises a substantially axial boring; a duct branching off from said boring; a conduit branching off from said boring in the vicinity of said duct; a passage connecting said boring to the atmosphere; means for adjusting the cross-section of said passage; a slide-valve adapted to slide along said boring and to control said duct, said conduit and said passage so that, in one position of said slide-valve, said duct and said conduit are cut off from one another and said conduit and said passage are connected up to one another, and in another position of said slide-valve, said duct and said conduit are connected up to one another and said passage is cut off; and a coil adapted to control said slide-valve; wherein the piping means comprises piping connecting the pressure-operated means to said conduit; and further piping connecting the source of pressure to said duct; and wherein the electromagnetic locking means comprises a plunger adapted to engage a notch in said slide-valve when the latter is in the position in which the duct and the conduit are connected up to one another; a spring adapted to urge said plunger into engagement with said notch; and a coil adapted to control said plunger, whereby the latter is disengaged when the coil is energized.

6. A speed changing device according to claim 4 wherein the pressure-operated means for actuating the butterfly throttle comprises a cylinder fast with the linkage to the accelerator pedal, said cylinder being connected to said piping means down-stream with respect to said valve means; a piston adapted to move inside said cylinder; a rod integral with said piston and hinged to said butterfly throttle; a spring inside said cylinder adapted to urge said piston in opposition to the action of pressure; a second spring outside said cylinder, supported thereon and arranged around said rod; a contact member at the end of said second spring and adapted to slide along said rod; a further contact member carried by said rod; and a third spring between said contact members and adapted to urge them away from one another; and wherein the switch located in the energizing circuit of the locking means is constituted by said contact members.

7. A semi-automatic speed changing device for a vehicle provided with wheels connected to an engine through a clutch and a gear-box controlled by a gear shift lever, said wheels being provided with brakes controlled by a brake-pedal, said device comprising pressure-operated means for actuating said clutch; piping means between said pressure-operated means and a source of pressure adapted to feed the same; electromagnetic valve means for controlling said piping means; a source of electric current adapted to energize said valve means and connected thereto through an electric current; in said circuit a switch adapted to be operated while the gear shift lever is actuated and to be returned to its initial position when said gear shift lever is released; and a second switch arranged in parallel with the former one and adapted to be actuated when the brake-pedal is lowered and to be returned to its initial position when said brake-pedal is released.

8. A semi-automatic speed changing device for a vehicle provided with wheels connected to an engine through a clutch and a gear-box controlled by a gear shift lever, said wheels being provided with brakes controlled by a brake-pedal, said pedal controlling a braking signal switch, said device comprising pressure-operated means for actuating said clutch; piping means between said pressure-operated means and a source of pressure adapted to feed the same; electromagnetic valve means for controlling said piping means; a source of electric current adapted to energize said valve means and connected thereto through an electric circuit; in said circuit a switch adapted to be operated while the gear shift lever is actuated and to be returned to its initial position when said gear shift lever is released, said switch being arranged in parallel with said braking signal switch.

9. A speed changing device according to claim 7 wherein a hand-operated switch is arranged in series with said second switch.

10. A semi-automatic speed changing device for a vehicle provided with wheels connected to an engine through a clutch and a gear-box controlled by a gear shift lever, said wheels being provided with brakes controlled by a brake-pedal, said device comprising pressure-operated means for actuating said clutch; piping means between said pressure-operated means and a source of pressure adapted to feed the same; electromagnetic valve means for controlling said piping means; a source of electric current adapted to energize said valve means and connected thereto through an electric circuit; in said circuit a switch adapted to be operated while the gear shift lever is actuated and to be returned to its initial position when said gear shift lever is released; a second switch arranged in parallel with the former one and adapted to be actuated when the brake-pedal is lowered and to be returned to its initial position when said brake-pedal is released; a third switch arranged in series with said second switch; and speed responsive means for actuating said third switch, whereby said third switch is closed when the vehicle is at rest and when it runs at a speed lower than a predetermined value, and it opens when the vehicle runs at a speed higher than said value.

11. A speed changing device according to claim 10 wherein the engine is fed through a suction manifold; wherein the speed responsive means comprise an enclosure; a connection between said enclosure and said suction manifold; a valve adapted to control said connection; a spring adapted to urge said valve in closing position with respect to said connection; means for adjusting the tension of said spring; a diaphragm across said enclosure adapted to divide the latter into two chambers; a rod secured to said diaphragm; contact members fast with said rod; conducting studs opposite said contact members; and a spring adapted to urge said members into contact with said studs; and wherein the third switch is constituted by said contact members and said studs.

12. A semi-automatic speed changing device for a vehicle provided with wheels connected to an engine through a clutch and a gear-box controlled by a gear shift lever, said engine being fed through a carburetor provided with a butterfly throttle connected through a linkage to an accelerator pedal, said device comprising pressure-operated means for actuating said clutch; piping means between said pressure-operated means and a source of pressure adapted to feed the same; electromagnetic valve means for controlling said piping means; a source of electric current adapted to energize said valve means and connected thereto through an electric circuit; in said circuit a switch adapted to be operated while the gear shift lever is actuated and to be returned to its initial position when said gear shift lever is released; and means under control of said electromagnetic valve means for progressively opening said butterfly throttle when said electromagnetic valve means is released.

13. A speed changing device according to claim 12 wherein the gear shift lever is provided with a knob consisting of a fixed part secured to said lever and provided with an axial projection and a movable part provided with a central recess wherein said axial projection is introduced, said movable part being urged away from said fixed part by a spring, the displacement of said movable part away from said fixed part being limited by a stop arranged on said projection of said fixed part; and wherein the switch consists of two conducting members arranged opposite one another, one of said members being externally carried by said axial projection of said fixed part and the other of said members being secured to said movable part within said recess and being adapted to come into contact with the former member and to be distant therefrom according to the position of said movable part relatively to said fixed part.

ROGER CHAMBONNEAU.

REFERENCES CITED

The following references are of record in the file of this patent:

UNITED STATES PATENTS

| Number | Name | Date |
|---|---|---|
| 1,806,158 | Giger | May 19, 1931 |
| 2,109,443 | Hill et al. | Feb. 22, 1938 |
| 2,206,586 | Struck | July 2, 1940 |
| 2,296,289 | Mayrath | Sept. 22, 1942 |